US012786736B2

(12) United States Patent
Stirling et al.

(10) Patent No.: US 12,786,736 B2
(45) Date of Patent: Nov. 3, 2026

(54) OPTIMIZING WIFI ACCESS POINT PLACEMENT WITH MACHINE LEARNING TO MINIMIZE STICKY CLIENTS

(71) Applicant: Cisco Technology, Inc., San Jose, CA (US)

(72) Inventors: Tim S. Stirling, Gilly (CH); Federico Lovison, Fontanelle (IT); Naga Raghu Ramprasad Nandigama, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 18/417,852

(22) Filed: Jan. 19, 2024

(65) Prior Publication Data

US 2025/0240642 A1 Jul. 24, 2025

(51) Int. Cl.
*H04W 16/18* (2009.01)
*H04L 41/16* (2022.01)

(52) U.S. Cl.
CPC ............. *H04W 16/18* (2013.01); *H04L 41/16* (2013.01)

(58) Field of Classification Search
CPC ............................... H04W 16/18; H04L 41/16
See application file for complete search history.

(56) References Cited

U.S. PATENT DOCUMENTS

| | | | | |
|---|---|---|---|---|
| 10,794,983 | B1 * | 10/2020 | Chandail | G01S 3/325 |
| 2019/0116485 | A1 * | 4/2019 | Vasseur | H04W 28/04 |
| 2019/0230620 | A1 * | 7/2019 | Ohlarik | H04W 24/10 |
| 2019/0297546 | A1 * | 9/2019 | Likar | H04B 17/327 |
| 2021/0105696 | A1 | 4/2021 | Ozkan et al. | |
| 2022/0095120 | A1 | 3/2022 | Panje et al. | |
| 2022/0255799 | A1 | 8/2022 | Singla et al. | |
| 2022/0321422 | A1 | 10/2022 | Jupudi et al. | |
| 2022/0330047 | A1 * | 10/2022 | Wang | H04W 28/0268 |
| 2022/0408271 | A1 * | 12/2022 | Phillippe | H04W 16/18 |
| 2023/0091127 | A1 | 3/2023 | Lin et al. | |

OTHER PUBLICATIONS

Cisco Wireless Network. Solution Guide, © 2023 Cisco and/or its affiliates, Total pp. 202. (Year: 2023).*
Aruba: "Aruba AIOps Artificial Intelligence-powered Action for IT Operations", Solution Overview, 3 Pages.

(Continued)

*Primary Examiner* — Brian J. Gillis
(74) *Attorney, Agent, or Firm* — Patterson + Sheridan, LLP

(57) ABSTRACT

Techniques and apparatus for analyzing and optimizing an access point (AP) layout to reduce an occurrence of sticky clients within a network are described. An example technique includes obtaining a first layout of a set of APs to be deployed within an environment. A determination is made that at least a first AP of the set of APs will be associated with one or more sticky clients, based on evaluating the first layout with a machine learning model. A second layout of the set of APs to be deployed within the environment is generated using the machine learning model. Information associated with the second layout is transmitted.

20 Claims, 10 Drawing Sheets

(56) References Cited

OTHER PUBLICATIONS

Ibrahim T., et al., "Optimal Wireless Access Points Placement in a Manufacturing Facility using Genetic Algorithm", Proceedings of the International Conference on Industrial Engineering and Operations Management Washington DC, USA, Sep. 27-29, 2018, pp. 2504-2515.

Jiang T., "Uniform Design Simulated Annealing for Optimal Access Point Placement of High Data Rate Indoor Wireless LAN Using OFDM", The 14th IEEE 2003 International Symposium on Personal, Indoor and Mobile Radio Communication Proceedings, 2003, pp. 2302-2306.

Kobayashi M., et al., "Optimal Access Point Placement in Simultaneous Broadcast System using OFDM for Indoor Wireless LAN", 2000, pp. 200-204.

Miller M., "Juniper Mist Automatically Validates AP Placement", Jul. 14, 2022, pp. 1-4.

Rengarajan B., et al., "Optimizing Placement of Wireless Access Points", 2005, 6 Pages.

Sanguino T.J.M., et al., "Optimal Design and Deployment of Wireless LANs Based on Evolutionary Genetic Strategy", 2016, 8 Pages.

Valenza S., "Cisco Wireless 3D Analyzer: A Game Changer in Simplifying WiFi Planning, Monitoring and Troubleshooting", Oct. 28, 2021, pp. 1-18.

* cited by examiner

OPTIMIZING WIFI ACCESS POINT PLACEMENT WITH MACHINE LEARNING TO MINIMIZE STICKY CLIENTS

TECHNICAL FIELD

Embodiments presented in this disclosure generally relate to wireless communications. More specifically, embodiments disclosed herein relate to techniques for analyzing and optimizing a deployment of access points to reduce an occurrence of sticky clients within a wireless network.

BACKGROUND

Wireless networks have long been impacted by sticky clients, which is a term generally used to describe a client station (STA) that stays associated to an access point (AP) long after the client STA has reached the basic service set (BSS) of another AP offering better connection conditions. For example, the roaming process generally involves a client STA deciding to dissociate from one AP and deciding to reassociate to a new AP. However, because the roaming process is generally controlled by the client STA itself, this process can lead to scenarios in which some client STAs may not reassociate to a different AP offering better connection conditions.

The presence of sticky clients within a wireless network can impact the performance of the sticky clients themselves as well as the performance of other client STAs within the network. For example, a sticky client in poor connection conditions may communicate using a lower modulation and coding scheme (MCS). In addition, the lower MCS used by sticky client(s) can take a higher proportion of the airtime being shared by all client STAs within the wireless network connected to the same AP as the sticky client(s), impacting the network performance of all client STAs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
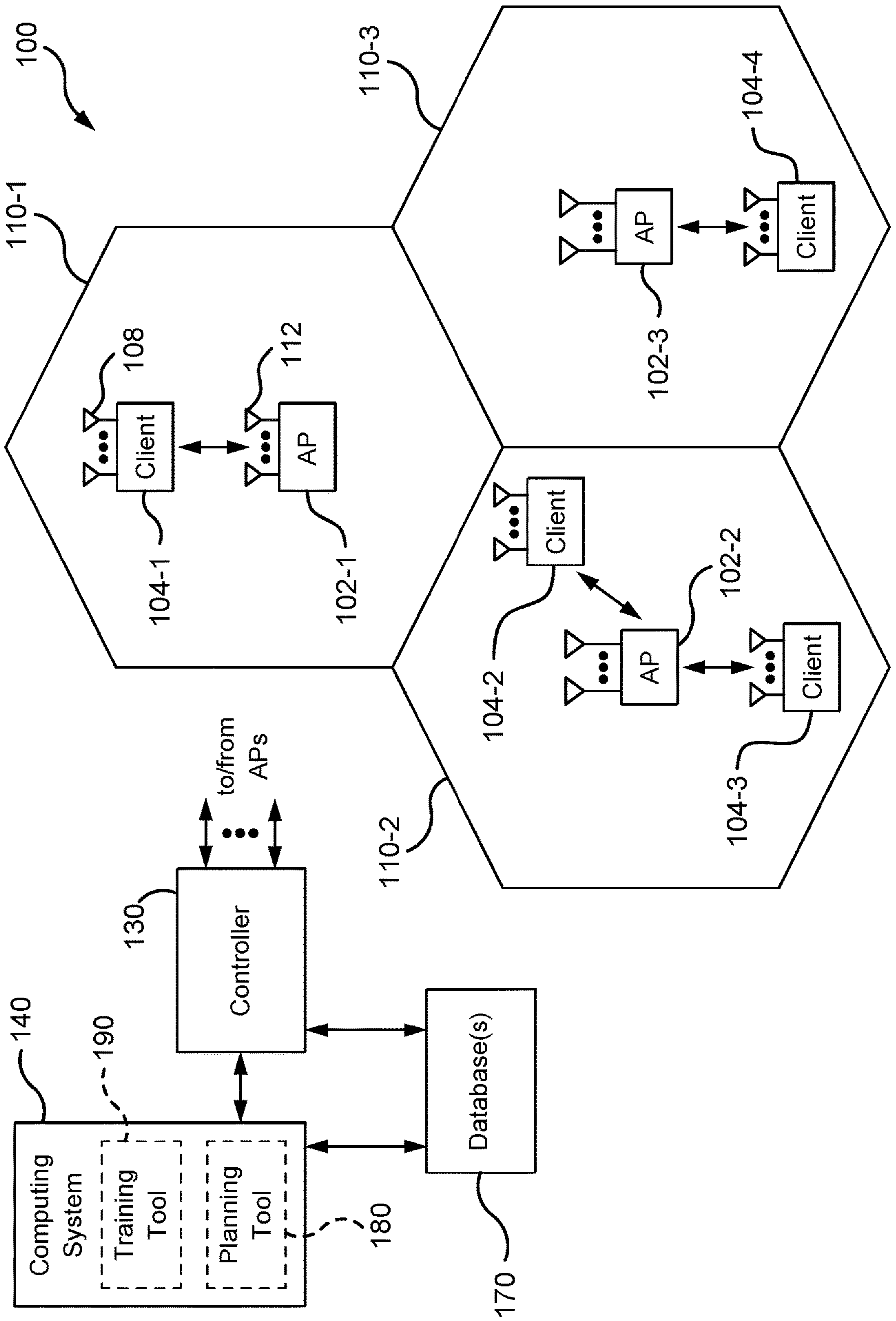
FIG. 1 illustrates an example system, according to one embodiment.

One embodiment described herein is a computer-implemented method. The computer-implemented method includes obtaining a first layout of a set of access points (APs) to be deployed within an environment. The computer-implemented method also includes determining, based on evaluating the first layout with a machine learning model, that at least a first AP of the set of APs, will be associated with one or more sticky clients. The computer-implemented method further includes generating a second layout of the set of APs to be deployed within the environment using the machine learning model. The computer-implemented method further includes transmitting information associated with the second layout.

Another embodiment described herein is a system. The system includes one or more memories collectively storing computer-executable instructions. The system also includes one or more processors communicatively coupled to the one or more memories. The one or more processors are collectively configured to execute the computer-executable instructions to cause the system to perform an operation. The operation includes obtaining a first layout of a set of access points (APs) to be deployed within an environment. The operation also includes determining, based on evaluating the first layout with a machine learning model, that at least a first AP of the set of APs, will be associated with one or more sticky clients. The operation further includes generating a second layout of the set of APs to be deployed within the environment using the machine learning model. The operation further includes transmitting information associated with the second layout.

Another embodiment described herein is a non-transitory computer-readable medium. The non-transitory computer-readable medium includes computer-executable instructions, which when collectively executed by one or more processors of a computing system cause the computing system to perform an operation. The operation includes obtaining a first layout of a set of access points (APs) to be deployed within an environment. The operation also includes determining, based on evaluating the first layout with a machine learning model, that at least a first AP of the set of APs, will be associated with one or more sticky clients. The operation further includes generating a second layout of the set of APs to be deployed within the environment using the machine learning model. The operation further includes transmitting information associated with the second layout.

Other embodiments provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein.

EXAMPLE EMBODIMENTS

In certain wireless networks (e.g., enterprise wireless local area networks (LANs) (WLANs)), seamless roaming by client STAs (e.g., smartphones, laptops, etc.) between APs plays a crucial role in ensuring the network and user application performance. Although several extensions to wireless communication standards, such as the Institute of Electrical and Electronics Engineers (IEEE) 802.11 technical standard, have been released to improve roaming by aiding clients, one potential drawback to these efforts is the fact that the process of a client STA deciding to dissociate from one AP and reassociate to a new AP (with preferably a better radio frequency connection as indicated by a stronger received signal strength indicator (RSSI)) is generally controlled by the client STA itself.

In particular, in some cases, the roaming process may be sub-optimal and result in some client STAs staying associated to an AP with a lower RSSI as opposed to reassociating to a different AP with a higher RSSI. Such client STAs that behave in this manner are generally referred to as sticky clients. A sticky client connected to a given AP may experience diminished network performance (e.g., reduced throughput, increased latency, etc.). Additionally, the presence of the sticky client can impact the performance of other client STAs connected to the same AP as the sticky client. For example, a sticky client with a low RSSI may communicate using a lower MCS for successful packet delivery. Packets transmitted with a lower MCS, however, may take a higher proportion of the airtime, which is shared between all client STAs connected to the same AP. As such, other client STAs connected to the same AP as the sticky client(s) can also experience diminished network performance.

Certain embodiments described herein provide techniques for analyzing (or evaluating) and/or optimizing an AP layout (as well as radio resource configurations of the APs within the AP layout) using machine learning (ML) in order to reduce the occurrence of sticky clients within a wireless network. In certain scenarios, the physical topology of deployed APs may have a significant impact on the occurrence of sticky clients. For example, certain AP layouts and radio resource configurations, such as maximum transmit power, may create environments where some APs are prone to suffer from sticky clients (e.g., the likelihood of the AP(s) being associated with a sticky client is greater than a threshold).

According to certain embodiments herein, one or more ML models are trained to predict a likelihood of an AP in an AP layout being associated with a sticky client. The ML model(s) can be trained based on a dataset including one or more AP parameters (e.g., AP placement locations, inter-AP RSSIs, AP transmit powers, etc.) and one or more client STA parameters (e.g., client RSSI to associated AP, client RSSI(s) to neighboring AP(s), client STA type, etc.). Once trained, the ML models can be used to analyze and/or optimize different types of AP deployments to reduce the occurrence of sticky clients. The ML models can be configured to analyze and/or optimize an AP deployment with or without the use of client telemetry data.

In certain embodiments described herein, the trained ML model(s) can be used to analyze a proposed AP layout and associated radio resource configurations to determine whether at least one or more APs within the proposed AP layout have a high likelihood of being associated with one or more sticky clients. Additionally or alternatively, in certain embodiments described herein, the trained ML models can be used to monitor an existing deployment of APs within an environment and determine an adjustment to the deployment of APs and/or associated radio resource configurations to reduce the occurrence of sticky clients. Additionally or alternatively, in certain embodiments described herein, the trained ML models can be used to determine an optimal location for adding an AP within an existing deployment of APs, where the optimal location is associated with a target likelihood (e.g., minimum likelihood or below a threshold likelihood) of being associated with a sticky client.

In certain embodiments, the techniques described herein can be incorporated into network planning tools that are used to design and analyze AP layouts for a given environment. For example, the techniques described herein allow for designing an AP layout to minimize (or at least reduce) the occurrence of sticky clients as well as to meet other deployment metrics, such as a target coverage, expected RSSI, and client capacity, as illustrative, non-limiting examples.

Advantageously, the techniques described herein can improve the communication performance (e.g., increased throughput, lower latency, lower interference, etc.) of client STAs within a wireless network by reducing the occurrence of sticky clients within the wireless network.

Note, the techniques described herein for analyzing and/or optimizing an AP layout (as well as associated radio resource configurations) to reduce the occurrence of sticky clients may be incorporated into (such as implemented within or performed by) a variety of wired or wireless apparatuses (such as nodes). In some implementations, a node includes a wireless node. Such wireless nodes may provide, for example, connectivity to or for a network (such as a wide area network (WAN) such as the Internet or a cellular network) via a wired or wireless communication link. In some implementations, a wireless node may include a computing system or a controller.

FIG. 1 illustrates an example system in which one or more techniques described herein can be implemented, according to one embodiment. As shown, the system 100 includes, without limitation, one or more APs (e.g., AP 102-1, AP 102-2, and AP 102-3), one or more client STAs (e.g., client STA 104-1, client STA 104-2, client STA 104-3, and client STA 104-4), a controller 130, a computing system 140, and one or more databases 170.

An AP is generally a fixed station that communicates with client STA(s) and may be referred to as a base station, wireless device, or some other terminology. A client STA may be fixed or mobile and also may be referred to as a mobile STA, a client, a STA, a wireless device, or some other terminology. Note that while a certain number of APs and client STAs are depicted, the system 100 may include any number of APs and client STAs.

As used herein, an AP along with the STAs associated with the AP (e.g., within the coverage area (or cell) of the AP) may be referred to as a basic service set (BSS). Here, AP 102-1 is the serving AP for client STA 104-1, AP 102-2 is the serving AP for client STAs 104-2 and 104-3, and AP 102-3 is the serving AP for client STA 104-4. The AP 102-1, AP 102-2, and AP 102-3 are neighboring (peer) APs. The APs 102 may communicate with one or more client STAs 104 on the downlink and uplink. The downlink (e.g., forward link) is the communication link from the AP 102 to the client STA(s) 104, and the uplink (e.g., reverse link) is the communication link from the client STA(s) 104 to the AP 102. In some cases, a client STA may also communicate peer-to-peer with another client STA.

As shown in FIG. 1, each client STA 104 includes one or more radios 108. The client STA 104 can use one or more of the radios 108 to form links with an AP 102. As also shown, each AP 102 includes one or more radios 112 that the AP 102 can use to form links with one or more client STAs 104. In general, the AP(s) 102 and the client STA(s) 104 may form any suitable number of links for communication using any suitable frequencies. In some instances, a client STA 104 may form multiple links with a single AP 102.

In certain embodiments, the APs 102 may be controlled or managed at least partially by the controller 130. Here, the controller 130 couples to and provides coordination and control for the APs 102 1-3. For example, the controller 130 may handle adjustments to RF power, channels, authentication, and security for the APs. The controller 130 may also coordinate the links formed by the client STA(s) 104 with the APs 102.

The operations of the controller 130 may be implemented by any device or system, and may be combined or distributed across any number of systems. For example, the controller 130 may be a WLAN controller for the deployment of APs 102 within the system 100. In some examples, the controller 130 is included within or integrated with an AP 102 and coordinates the links formed by that AP 102 (or otherwise provides control for that AP). For example, each AP 102 may include a controller that provides control for that AP. In some examples, the controller 130 is separate from the APs 102 and provides control for those APs. In FIG. 1, for example, the controller 130 may communicate with the APs 102 1-3 via a (wired or wireless) backhaul. The APs 102 1-3 may also communicate with one another, e.g., directly or indirectly via a wireless or wireline backhaul. Example hardware that may be included in a controller 130 is discussed in greater detail with regard to FIG. 10.

The database(s) 170 are representative of storage systems that may include historical and/or real-time AP telemetry data associated with one or more AP deployments, historical and/or real-time client STA telemetry data associated with one or more AP deployments, AP topological information (e.g., AP positions, positions/arrangements of interfering physical structures, such as walls) associated with one or more AP layouts, radio resource configurations (e.g., AP maximum transmit powers), radio resource management (RRM) information, logic (e.g., trained ML models) for analyzing and/or optimizing an AP layout, or a combination thereof.

Figure 2:
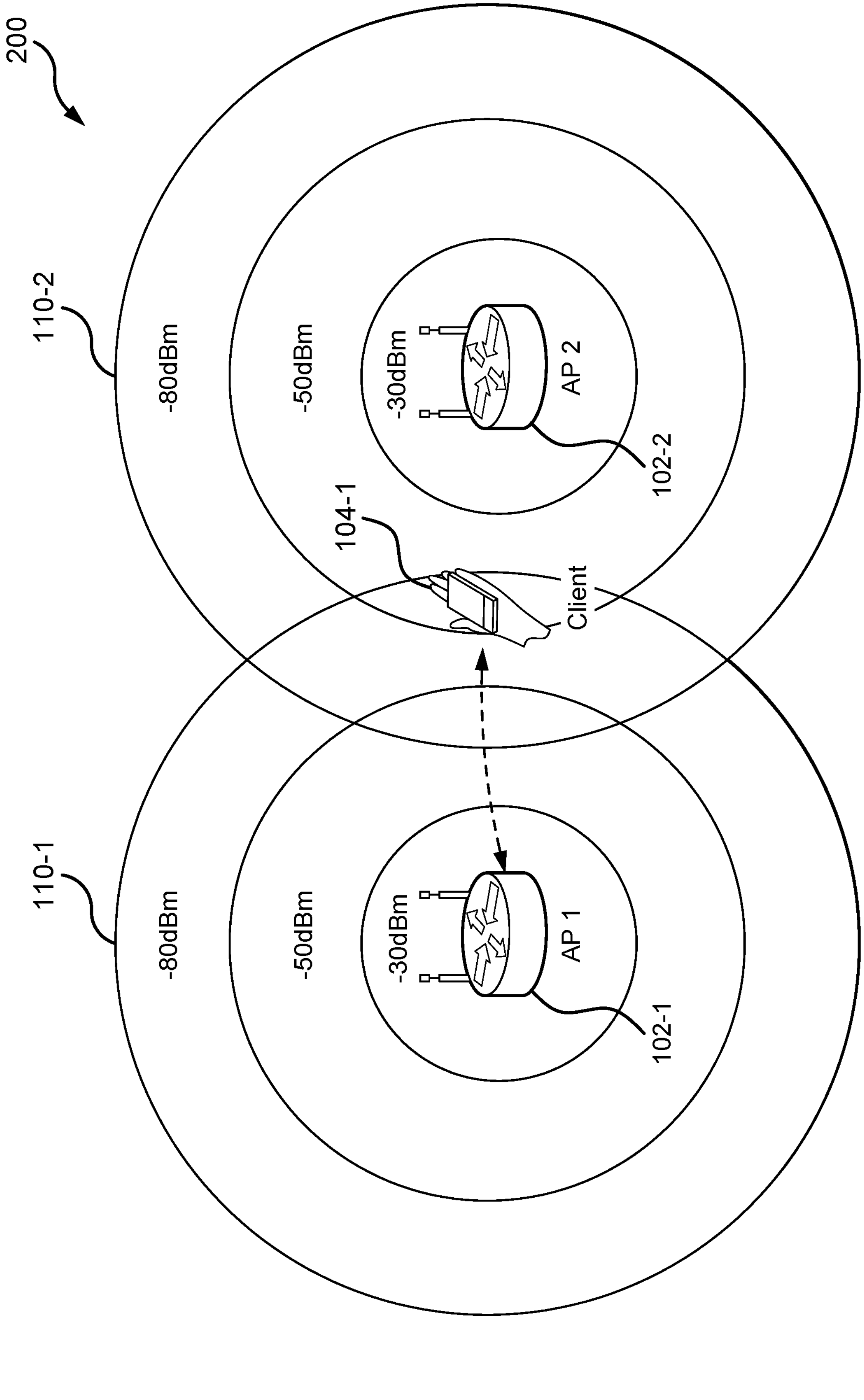
FIG. 2 illustrates an example sticky client scenario, according to one embodiment.

In certain cases, one or more client STAs 104 depicted in FIG. 1 may become sticky clients, where the client STA 104 stays associated to a current AP with a low RSSI for a threshold period of time as opposed to reassociating to a new AP with a higher RSSI. Consider the example scenario in FIG. 2, which illustrates a sticky client (e.g., client STA 104-1) within system 200, according to one embodiment. The system 200 may be similar to the system 100 depicted in FIG. 1. Here, the sticky client remains associated with AP 1 (e.g., AP 102-1) despite having a relative weaker RSSI compared to neighboring AP 2 (e.g., AP 102-2). For example, the sticky client's RSSI of AP 1 is approximately −80 decibels per milliwatt (dBm) and the sticky client's RSSI of AP 2 is approximately −50 dBm. As used herein, a sticky client may refer to a client STA (i) that is associated to an AP with a signal strength (e.g., RSSI) lower than a threshold (e.g., −65 dBm, −70 dBm, or another signal strength value), (ii) the signal strength of the client STA to the associated AP is lower than the signal strength of the client STA to a neighboring AP by a threshold margin, and (iii) the association to the AP with the lower signal strength has persisted for a threshold amount of time.

Figure 3:
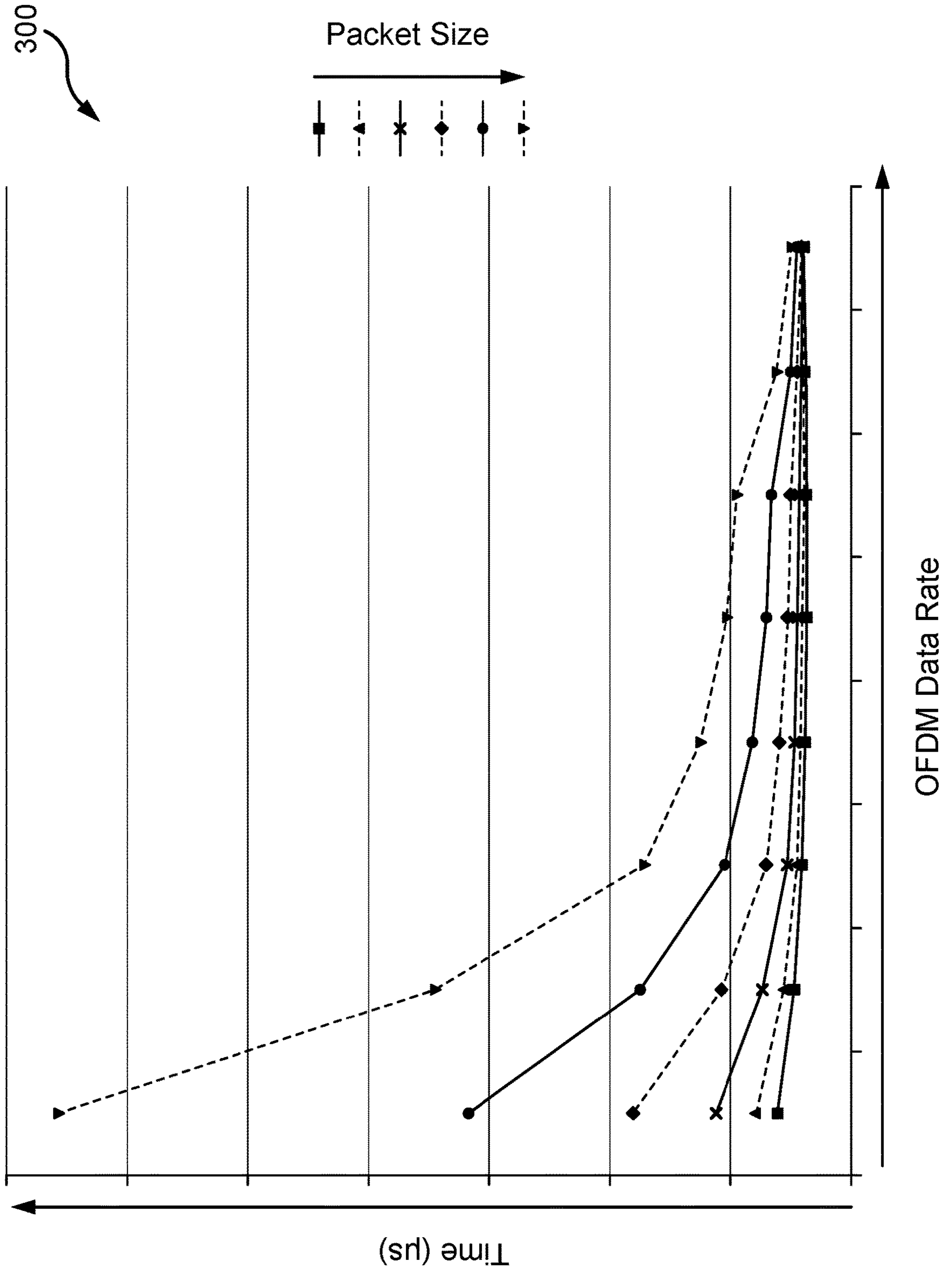
FIG. 3 is an example plot depicting transmit times for different packet sizes, according to one embodiment.

As noted, the presence of a sticky client can impact the network performance of all client STAs connected to the AP (e.g., AP 1) that is associated with the sticky client, due to the shared airtime between the client STAs and the use of lower MCS rates by the sticky client. In particular, as shown in the plot 300 of FIG. 3, packets transmitted at lower MCS rates may have longer transmit times than packets transmitted at higher MCS rates, and thus may take up a higher proportion of the shared airtime than packets transmitted at higher MCS rates.

Accordingly, certain embodiments described herein provide techniques for using machine learning to analyze a layout of APs (as well as their radio resource configurations) to determine a likelihood that a given AP within the AP layout will be associated with a sticky client. The techniques presented herein can analyze a proposed AP layout to be deployed in an environment without the use of client telemetry data. As such, the techniques described herein may enable network administrators to optimize an AP layout and/or radio resource configurations during the design stage and before deployment, or when planning to place additional APs. Additionally, the techniques described herein for analyzing and/or optimizing an AP layout (including associated radio resource configurations) can be incorporated into existing AP layout optimization techniques as part of a multi-objective optimization, such that service levels, capacity, and other deployment parameters can be considered alongside the propensity for sticky clients.

As shown, the computing system 140 includes a planning tool 180 and a training tool 190, each of which is configured to implement one or more techniques described herein. Although a single computing system 140 is depicted, note that the planning tool 180 and training tool 190 may be implemented using any number of computing systems. For example, one or more operations of the planning tool 180 and/or the training tool 190 may be performed by one or more computing systems distributed across a cloud computing environment. The planning tool 180 and the training tool 190 may include hardware, software, or combinations thereof.

In certain embodiments, the training tool 190 may train one or more ML models to predict a likelihood of an AP being associated with a sticky client. The training tool 190 may store the trained ML models in one or more database(s) 170. The planning tool 180 may obtain the trained ML model(s) from the database(s) 170 and use the trained ML models to analyze and/or optimize an AP layout as well as the associated radio resource configurations to reduce an occurrence of sticky clients.

Figure 4:
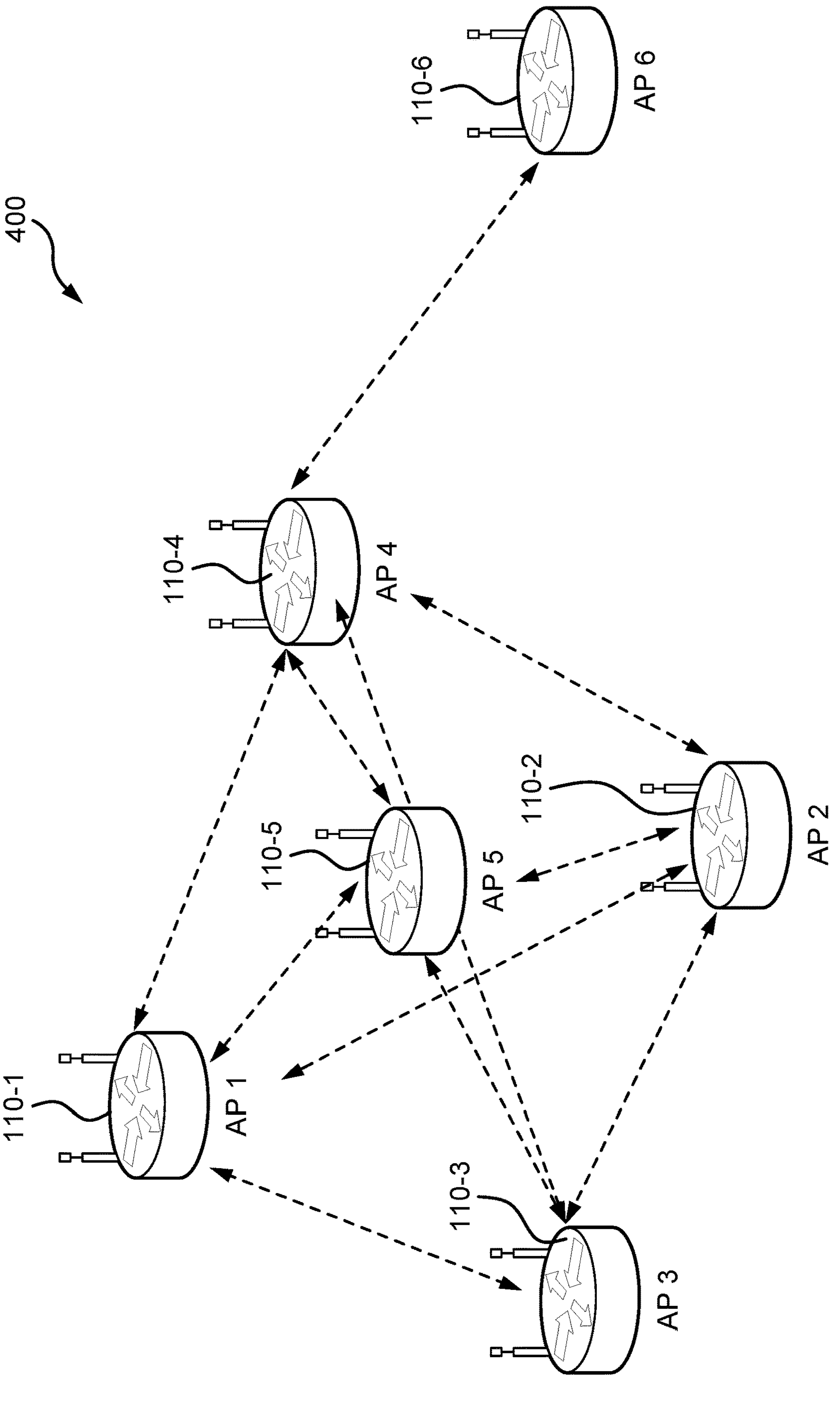
FIG. 4 illustrates an example AP layout, according to one embodiment.

An example AP layout 400 is depicted in FIG. 4. The AP layout 400 includes AP 1 to AP 6 (e.g., AP 110-1 to AP 110-6, respectively). The AP layout 400 may be a proposed AP layout for deploying the 6 APs within an environment or a current AP layout associated with an existing deployment of the 6 APs.

In certain cases, the physical topology of the AP layout 400 and/or the radio resource configurations of the APs may have an impact on the occurrence of sticky clients within a wireless network configured with the AP layout 400. In FIG. 4, for example, the inter-AP RSSIs may have a significant impact on the probability that an AP may be impacted by a sticky client. Note that inter-AP RSSI is one example parameter that may be indicative of the AP topology associated with an AP layout, such as AP layout 400. In general, when there is a large overlap in coverage areas of APs, some of the APs, such as AP 5, may have a high neighbor count and thus a higher likelihood of being associated with a sticky client compared to an AP, such as AP 6, with fewer neighbors. The training tool 190 may use such information associated with an AP layout (e.g., inter-AP RSSI along with other AP-related parameters and client STA-related parameters) to train a ML model to predict the likelihood of an AP being associated with a sticky client.

Figure 5:
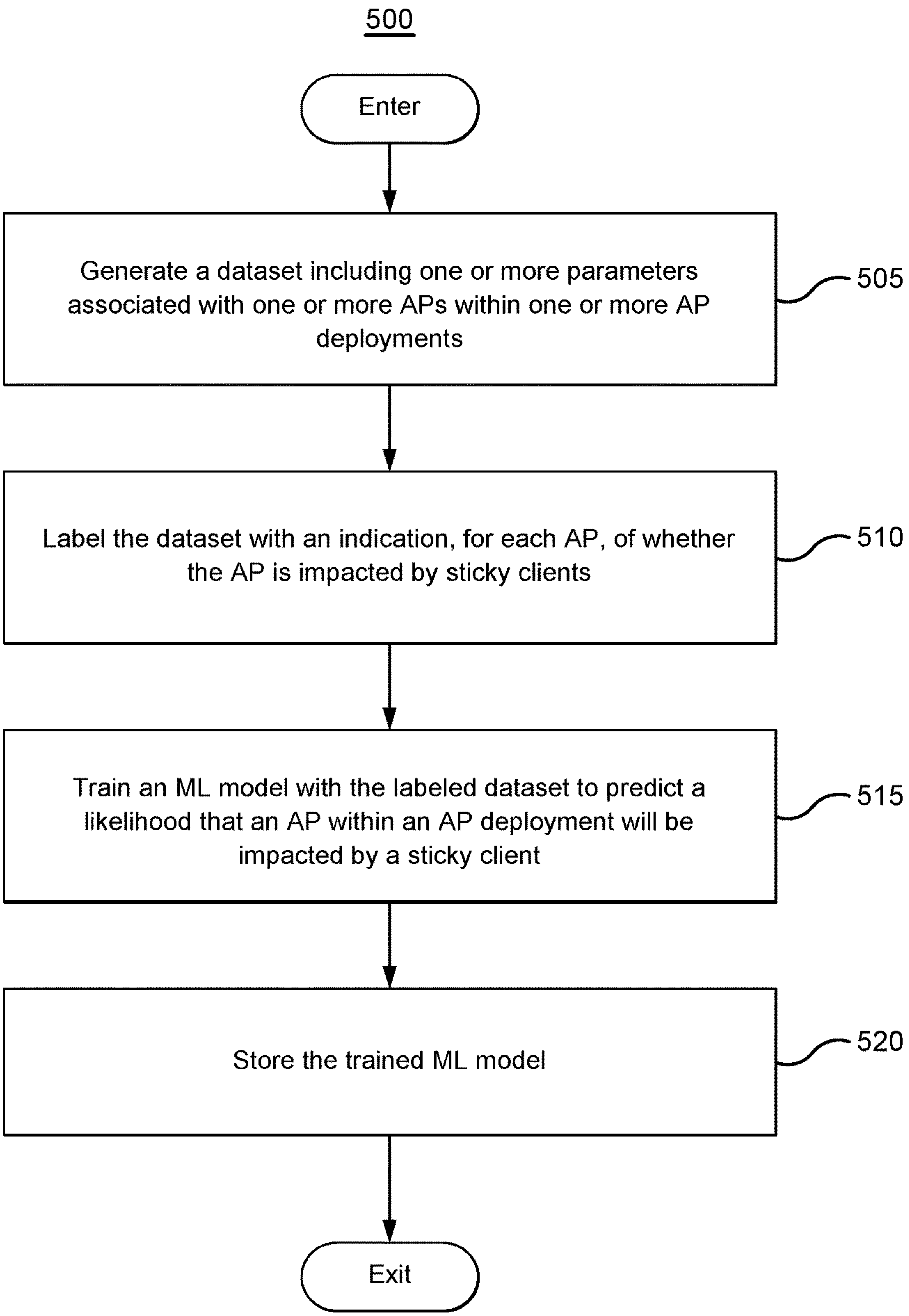
FIG. 5 is a flowchart of a method for training a machine learning model to predict a likelihood of an AP being associated with one or more sticky clients, according to one embodiment.

FIG. 5 is a flowchart of a method 500 for training a ML model to predict a likelihood of an AP being associated with a sticky client, according to one embodiment. The method 500 may be performed by a training tool, such as training tool 190.

Method 500 may enter at block 505, where the training tool generates a dataset including one or more parameters associated with one or more APs within one or more AP deployments. For example, the dataset may include a respective set of information for each AP, where each set of information includes an AP identifier, the (maximum) transmit power of the AP, AP location, average number of associated client STAs over a time period, and one or more RSSIs to one or more neighboring APs. The one or more RSSIs may be measured or estimated from inter-AP distances and environmental obstructions. Note, the dataset may include information from one or more different time windows (e.g., 5 minutes, 1 hour, 1 day, etc.).

At block 510, the training tool labels the dataset with an indication, for each AP, of whether the AP is associated with sticky clients. In certain embodiments, the training tool may use a set of client STA-related parameters to label each AP with an indication of whether the AP is associated with sticky clients. The client STA-related parameters may include, for each client STA, the RSSI of the client STA to its associated AP, the respective RSSI of the client STA to each neighboring AP, or a combination thereof.

Note, in certain embodiments, the training tool may obtain the AP-related parameters and/or the client STA-related parameters from a computing system(s) located in a cloud computing environment and/or a database (e.g., database 170) associated with the computing system(s). Such computing system(s) may be configured to perform network management tasks, such as security, predictive monitoring, and automation, as illustrative, non-limiting examples. As part of the network management tasks, the computing system(s) may periodically collect and store AP telemetry data and/or client STA telemetry data in one or more databases (e.g., database(s) 170). A reference example of such a computing system is Cisco Digital Network Architecture (DNA)®.

In certain embodiments, as part of the operations in block 510, the training tool may evaluate the client STAs associated with each AP and label each client STA as a sticky client when the client STA (i) is currently associated to an AP with an RSSI lower than a threshold (e.g., −65 dBm), (ii) is associated with the AP with an RSSI lower than one of the client's neighboring APs, by a threshold margin (e.g., 5 dBm), and (iii) the sub-optimal AP association has persisted for more than a threshold amount of time (e.g., 10 minutes). The training tool (at block 510) may label each client STA as a non-sticky client when at least one of aforementioned conditions is not satisfied.

After labeling each client STA associated with an AP as a sticky client or non-sticky client, the training tool (at block 510) may compute the ratio of clients labeled sticky to clients labeled non-sticky for that AP. If the training tool (at block 510) determines that the ratio is greater than a threshold, then the training tool may label the AP as being prone to sticky clients. On the other hand, if the training tool (at block 510) determines that the ratio is not greater than the threshold, then the training tool may label the AP as not being prone to sticky clients. Note that the thresholds described herein may be adjusted for different AP layouts based on empirical data.

At block 515, the training tool trains an ML model with the labeled dataset to predict a likelihood that an AP will be associated with a sticky client. At block 520, the training tool stores the trained ML model (e.g., in a database 170).

The training tool may use any suitable supervised artificial intelligence (AI)/ML technique to train the ML model. Such techniques may include gradient boosting trees, logistic regression, support vector machines, random forest algorithms, k-nearest neighbors algorithm (k-NN), deep-learning algorithms, and adaptive boosting, as illustrative, non-limiting examples. In a particular embodiment, the training tool uses a deep-learning graph neural network (GNN) to train a ML model to classify APs as being prone to suffering from sticky clients. One potential advantage of a GNN is that a GNN can leverage the inherent graph nature of neighboring APs in an AP layout, such as the AP layout 400.

Note that the method 500 can be used to train different ML models for different scenarios or environments. For example, the training tool may incorporate information on client types as part of the dataset that is used to train an ML model. For instance, in some cases, the tendency of a client STA to act as a sticky client may be related to the client STA's hardware and/or software. This is because the process of dissociating from one AP and associating to a new AP while roaming is generally controlled by the client STA. As such, the probability of a given AP being associated with sticky clients may depend upon the expected distribution of different client types.

Accordingly, in certain embodiments, the training tool may generate different ML models based on different sets of training data, where each training dataset includes data from certain distributions of clients. For example, the training tool may generate a first model with a certain ratio of smartphones of various manufacturers, generate a second model with another ratio of smartphones of various manufacturers, generate a third model with data from industrial sensors, and so on. In general, a network administrator (via the planning tool 180) may select one of multiple available ML models to use for analyzing and/or optimizing an AP layout, based on the expected types of clients for the AP layout.

In certain embodiments, the training tool may generate ML models customized for certain client roaming patterns. Such ML models may be used in scenarios where an additional AP is to be deployed in an existing network. For example, a network administrator (via the planning tool 180) may select a particular ML model that is customized for the specific roaming patterns observed within the existing network. The roaming patterns may be determined based on client telemetry data collected from a computing system configured to perform one or more network management tasks. The client telemetry data may be used to fine tune a customized ML model using transfer learning.

Figure 6:
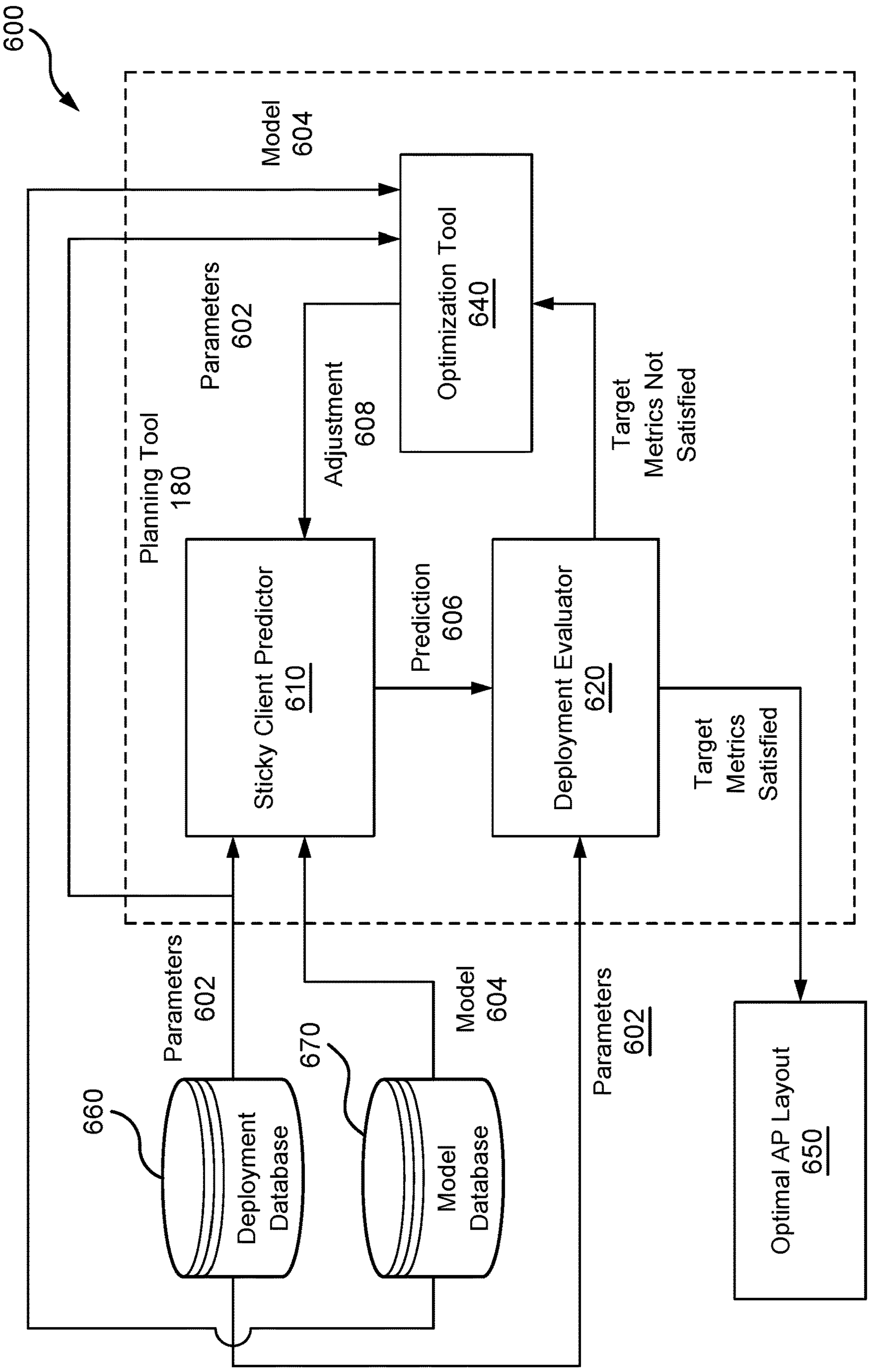
FIG. 6 is a block diagram of an example workflow for analyzing and/or optimizing an AP layout, according to one embodiment.

FIG. 6 is a block diagram of an example workflow 600 for analyzing and/or optimizing an AP layout, according to one embodiment. As shown, the planning tool 180 may include a sticky client predictor 610, a deployment evaluator 620, and an optimization tool 640.

The sticky client predictor 610 is generally configured to analyze an AP layout to predict a likelihood of one or more APs within the AP layout being associated with a sticky client. As shown, the sticky client predictor 610 may obtain parameters 602 associated with an AP layout from a deployment database 660, and may obtain a trained ML model 604 from the model database 670. Each of the databases 660 and 670 is a reference example of the database 170 depicted in FIG. 1.

At least some of the parameters 602 stored within the database 660 may be derived from network telemetry (e.g., inter-AP RSSIs and other AP neighbor information) collected from a computing system configured to perform network management. Additionally or alternatively, at least some of the parameters 602 stored within the database 660 may be derived from geometric information of the APs and their environment. Such geometric information may include physical positions of APs, positions and arrangements of potential interfering physical structures (e.g., walls), etc. In some cases, the geometric information may be in the form of two-dimensional (2D) and/or three-dimensional (3D) maps of the environment.

In certain embodiments, the parameters 602 may include AP parameters, such as one or more inter-AP RSSIs, number of APs, AP positions, and maximum AP transmit powers, as illustrative reference examples. In other embodiments, the parameters 602 may include AP parameters (e.g., inter-AP RSSIs, AP positions, number of APs, maximum AP transmit powers, etc.) and client STA parameters (e.g., number of client STAs, client RSSI to associated AP, client RSSI to neighboring AP, client type, etc.) associated with an existing deployment of APs.

The sticky client predictor 610 may select one of multiple ML models within the model database 670 as the ML model 604, based on a type of environment and/or expected types of clients for the AP layout. The sticky client predictor 610 may output a prediction 606, based on analyzing the parameters 602 with the ML model 604. The prediction 606 may include, for each AP, an indication of the likelihood that the AP will be associated with a sticky client (e.g., once the AP is deployed based on the AP layout).

The deployment evaluator 620 is generally configured to analyze the AP layout using the prediction 606 and parameters 602 to determine whether the AP layout meets a set of target deployment metrics, including target service level, target coverage, target client signal to noise ratio (SNR), and target (e.g., minimum) sticky client probabilities, as illustrative, non-limiting examples. The deployment evaluator 620 may use any suitable network planning algorithm and/or AI/ML model to evaluate the AP layout based on the prediction 606 and parameters 602. If the deployment evaluator 620 determines that the AP layout does not satisfy the set of target deployment metrics, then the deployment evaluator 620 may trigger the optimization tool 640 to optimize the AP layout and/or associated radio resource configuration. For example, the optimization tool 640 is generally configured to determine an adjustment 608 to the AP layout and/or radio resource configuration. In certain embodiments, the optimization tool 640 may use the ML model 604 (or another ML model obtained from the model database 670) to determine the adjustment 608. The adjustment 608 may include at least one of an adjustment to a number of APs in the AP layout, an adjustment to at least one AP position in the AP layout, or an adjustment to a maximum transmit power of at least one AP in the AP layout.

The sticky client predictor 610 may adjust one or more parameters 602 based on the adjustment 608, and (re)-compute a prediction 606 for the adjusted AP layout. Once the deployment evaluator 620 determines that the AP layout satisfies the set of target deployment metrics, then the deployment evaluator 620 may output an indication of the optimal AP layout 650. The optimal AP layout 650 may include a respective set of AP parameters (e.g., number of APs, AP locations, and maximum AP transmit powers), that are predicted to achieve the set of target deployment metrics.

Figure 7:
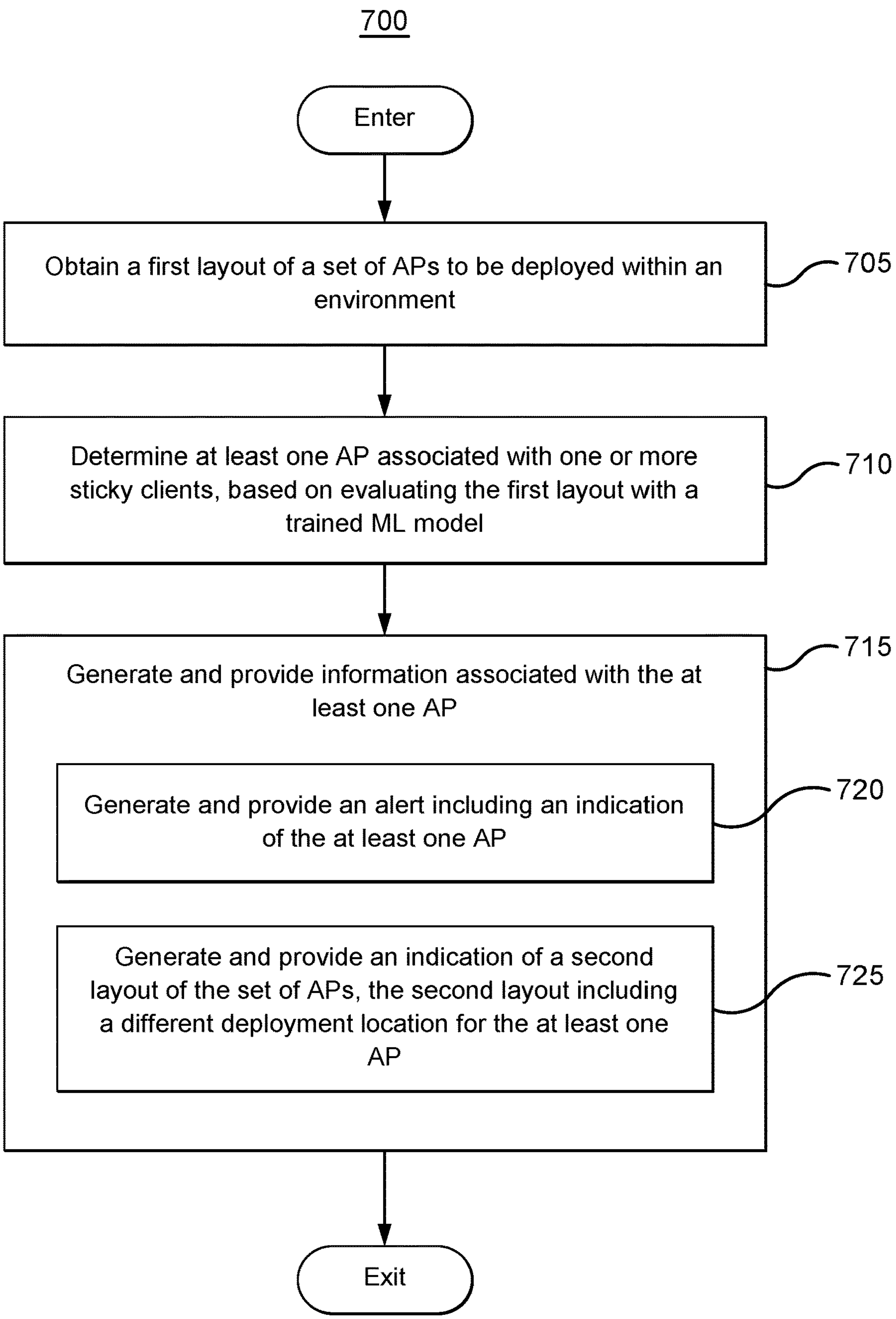
FIG. 7 is a flowchart of a method for analyzing and/or optimizing an AP layout, according to one embodiment.

FIG. 7 is a flowchart of a method 700 for analyzing and/or optimizing an AP layout to reduce an occurrence of sticky clients, according to one embodiment. The method 700 may be performed by a planning tool, such as planning tool 180. In certain embodiments, the AP layout may be a proposed AP layout to be used for deploying a set of APs in an environment.

Method 700 may enter at block 705, where the planning tool obtains a first layout of a set of APs to be deployed within an environment.

At block 710, the planning tool determines at least one AP within the first layout that is associated with one or more sticky clients, based on evaluating the first layout with a trained ML model (e.g., ML model 604). For example, the planning tool may determine that the likelihood of the at least one AP being associated with one or more sticky clients exceeds a threshold.

At block 715, the planning tool generates and provides information associated with the at least one AP, e.g., to a computing system associated with a network administrator. In certain embodiments, the computing system associated with the network administrator is the computing system 140 depicted in FIG. 1. In certain embodiments, the planning tool may provide (or display) the information on a user interface of a computing system associated with a network administrator (e.g., computing system 140). Block 715 may include one or more of sub-blocks 720 and 725. At sub-block 720, the planning tool generates and provides an alert including an indication of the at least one AP. At sub-block 725, the planning tool generates and provides an indication of a second layout of the set of APs, where the second layout includes a different deployment location for the at least one AP. The different deployment location for the at least one AP may have a lower likelihood of being associated with a sticky client.

Figure 8:
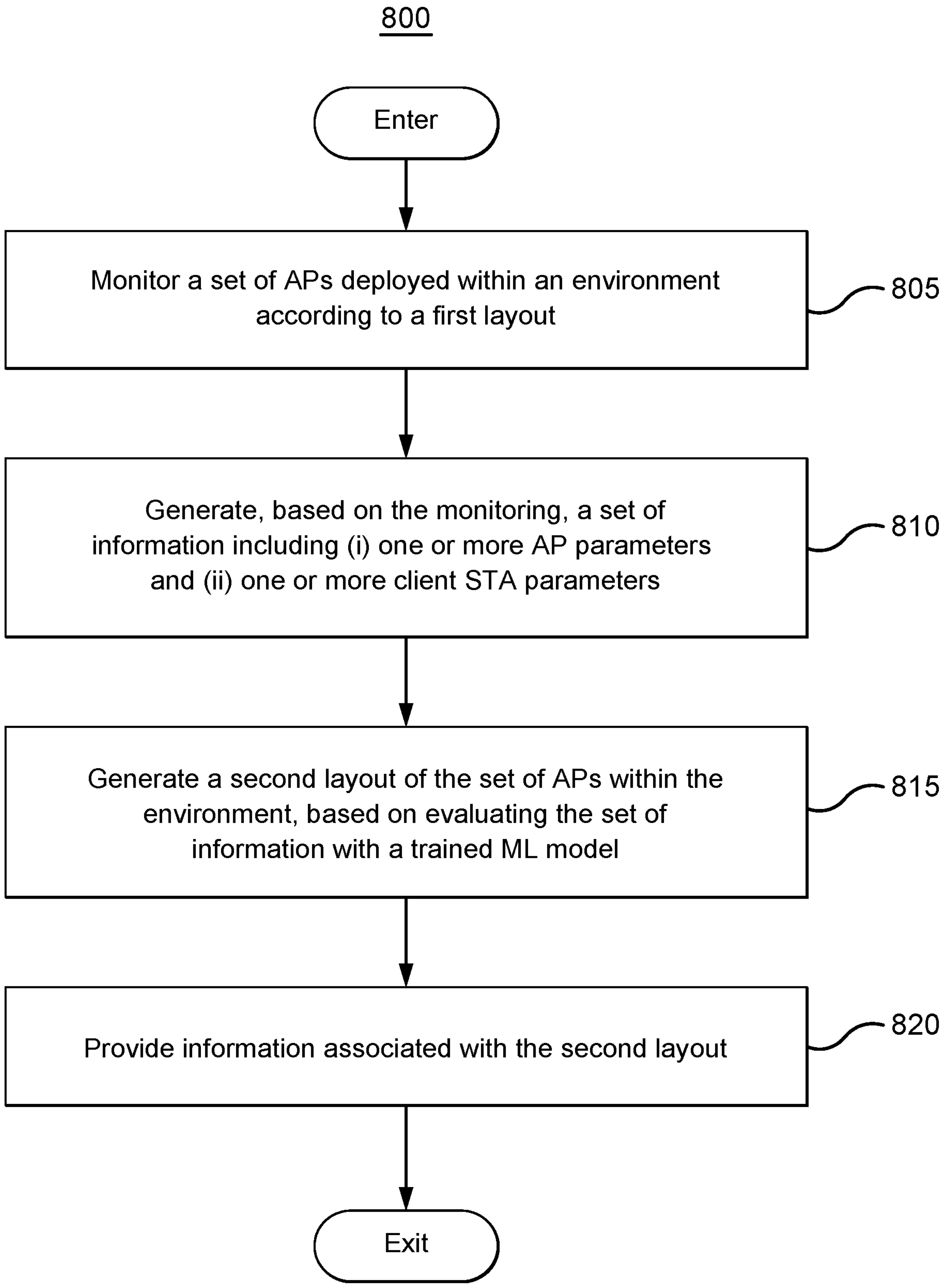
FIG. 8 is a flowchart of another method for analyzing and/or optimizing an AP layout, according to one embodiment.

FIG. 8 is a flowchart of a method 800 for analyzing and/or optimizing an AP layout to reduce an occurrence of sticky clients, according to one embodiment. The method 800 may be performed by a planning tool, such as planning tool 180. In certain embodiments, the AP layout may be an existing AP layout associated with an existing AP deployment within an environment.

Method 800 may enter at block 805, where the planning tool monitors an existing set of APs deployed within an environment according to a first layout. At block 810, the planning tool generates, based on the monitoring, a set of information including (i) one or more AP parameters and (ii) one or more client STA parameters.

At block 815, the planning tool generates a second layout of the set of APs within the environment, based on evaluating the set of information with a trained ML model. The second layout may include at least one adjustment to the set of APs deployed within the environment. For example, the adjustment can include an additional AP, removal of an AP, a different AP location, a different maximum transmit power of an AP, or a combination thereof. At block 820, the planning tool provides information associated with the second layout e.g., to a computing system associated with a network administrator (e.g., computing system 140). The second layout may have a lower likelihood of being associated with one or more sticky clients than the first layout.

Figure 9:
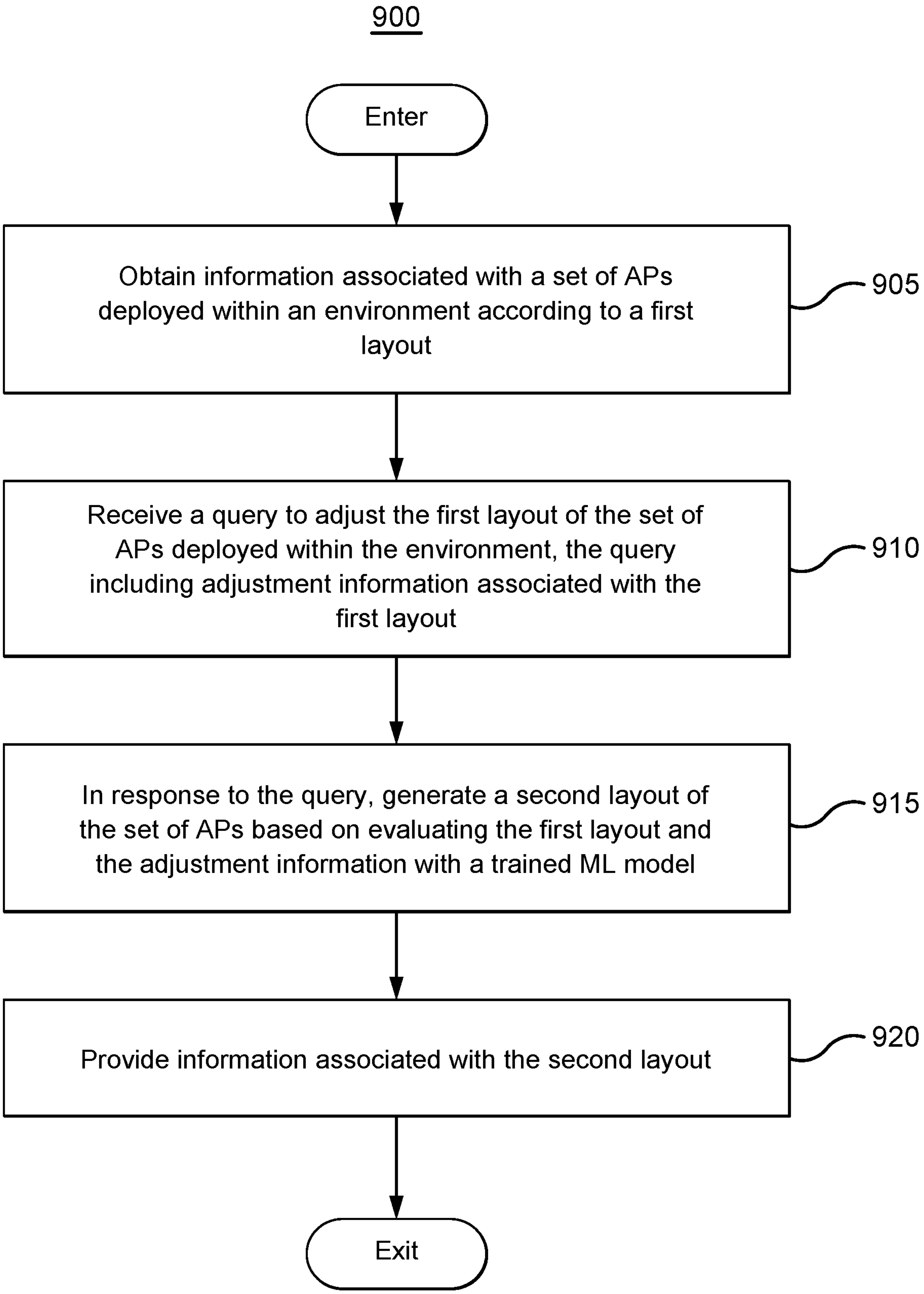
FIG. 9 is a flowchart of another method for analyzing and/or optimizing an AP layout, according to one embodiment.

FIG. 9 is a flowchart of a method 900 for analyzing and optimizing an AP layout to reduce an occurrence of sticky clients, according to one embodiment. The method 900 may be performed by a planning tool, such as planning tool 180. In certain embodiments, the AP layout may be an existing AP layout associated with an existing AP deployment within an environment.

Method 900 may enter at block 905, where the planning tool obtains information associated with a set of APs deployed within an environment according to a first layout. At block 910, the planning tool receives a query to adjust the first layout of the set of APs deployed within the environment. The query may include adjustment information associated with the first layout. The adjustment information may include an additional AP, a removal of an AP, a change in an AP location, or a combination thereof.

At block 915, in response to the query, the planning tool generates a second layout of the set of APs, based on evaluating the first layout and the adjustment information with a trained ML model. At block 920, the planning tool provides information associated with the second layout, e.g., to a computing system associated with a network administrator. The second layout may have a lower likelihood of being associated with one or more sticky clients than the first layout.

Figure 10:
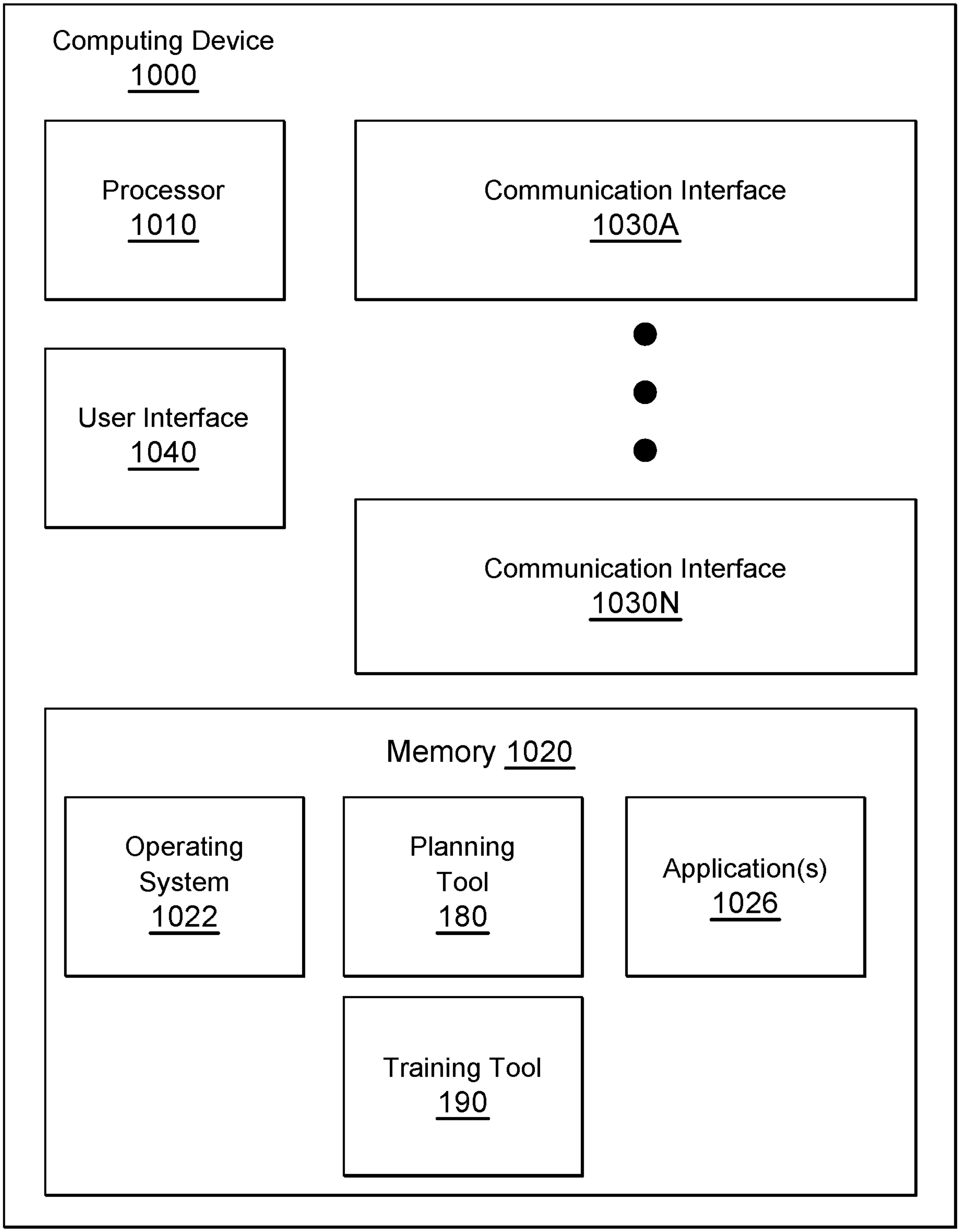
FIG. 10 illustrates an example computing device, according to one embodiment.

FIG. 10 illustrates an example computing device 1000, according to one embodiment. The computing device 1000 can be configured to perform one or more techniques described herein for optimizing an AP layout to reduce a likelihood of sticky clients. For example, the computing device 1000 can perform method 500, method 700, method 800, method 900, and any other techniques (or combination of techniques) described herein. The computing device 1000 may be representative of the computing system 140 or a controller (e.g., controller 130). The computing device 1000 includes, without limitation, a processor 1010, a memory 1020, a user interface 1040 (e.g., graphical user interface (GUI)), and one or more communication interfaces 1030*a-n* (generally, communication interface 1030). In one example, the communication interface 1030 includes a radio.

The processor 1010 may be any processing element capable of performing the functions described herein. The processor 1010 represents a single processor, multiple processors, a processor with multiple cores, and combinations thereof. The communication interfaces 1030 (e.g., radios) facilitate communications between the computing device 1000 and other devices. The communications interfaces 1030 are representative of wireless communications antennas and various wired communication ports.

The memory 1020 may be either volatile or non-volatile memory and may include RAM, flash, cache, disk drives, and other computer readable memory storage devices. Although shown as a single entity, the memory 1020 may be divided into different memory storage elements such as RAM and one or more hard disk drives. As shown, the memory 1020 includes various instructions that are executable by the processor 1010 to provide an operating system 1022 to manage various functions of the computing device 1000. The memory 1020 also includes the planning tool 180, the training tool 190, and one or more application(s) 1026.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method comprising:

obtaining a first layout of a set of access points (APs) to be deployed within an environment;

determining, based on evaluating the first layout with a machine learning model, that at least a first AP of the set of APs will be associated with one or more sticky clients;

generating a second layout of the set of APs to be deployed within the environment using the machine learning model; and transmitting information associated with the second layout.

2. The computer-implemented method of claim 1, wherein the machine learning model is trained to predict a likelihood that an AP will be associated with one or more sticky clients.

3. The computer-implemented method of claim 2, wherein the determination that at least the first AP will be associated with one or more sticky clients is based on determining that the likelihood predicted by the machine learning model is greater than a threshold.

4. The computer-implemented method of claim 2, wherein the machine learning model is trained on a dataset comprising (i) a plurality of AP identifiers, and (ii) for each AP identifier, an indication of whether the respective AP is associated with one or more sticky clients.

5. The computer-implemented method of claim 4, wherein the indication of whether the respective AP is associated with one or more sticky clients is based on (i) a first number of clients associated with the AP that are labeled as sticky clients and (ii) a second number of clients associated with the AP that are labeled as non-sticky clients.

6. The computer-implemented method of claim 1, wherein a sticky client is a client that (i) is associated to an AP with a signal strength lower than a threshold, (ii) the signal strength is lower than a signal strength to a neighboring AP, and (iii) the association has persisted for a threshold amount of time.

7. The computer-implemented method of claim 1, wherein:

the first layout of the set of APs comprises an indication of a respective proposed deployment location within the environment for each AP; and the second layout of the set of APs comprises, for at least one AP of the set of APs, a different proposed deployment location within the environment for the at least one AP.

8. The computer-implemented method of claim 1, wherein the information associated with the second layout comprises at least one of: (i) a number of the set of APs of the second layout, (ii) a respective location of each of the set of APs of the second layout, or (iii) a maximum transmit power of each of the set of APs of the second layout.

9. The computer-implemented method of claim 1, wherein the first layout of the set of APs is evaluated with the machine learning model without a set of client data associated with the first layout of the set of APs.

10. The computer-implemented method of claim 1, further comprising transmitting an indication of the first AP to a computing system.

11. A system comprising:

one or more memories collectively storing computer-executable instructions; and one or more processors communicatively coupled to the one or more memories, the one or more processors being collectively configured to execute the computer-executable instructions to cause the system to perform an operation comprising:

obtaining a first layout of a set of access points (APs) to be deployed within an environment;

determining, based on evaluating the first layout with a machine learning model, that at least a first AP of the set of APs will be associated with one or more sticky clients;

generating a second layout of the set of APs to be deployed within the environment using the machine learning model; and transmitting information associated with the second layout.

12. The system of claim 11, wherein the machine learning model is trained to predict a likelihood that an AP will be associated with one or more sticky clients.

13. The system of claim 12, wherein the determination that at least the first AP will be associated with one or more sticky clients is based on determining that the likelihood predicted by the machine learning model is greater than a threshold.

14. The system of claim 12, wherein the machine learning model is trained on a dataset comprising (i) a plurality of AP identifiers, and (ii) for each AP identifier, an indication of whether the respective AP is associated with one or more sticky clients.

15. The system of claim 14, wherein the indication of whether the respective AP is associated with one or more sticky clients is based on (i) a first number of clients associated with the AP that are labeled as sticky clients and (ii) a second number of clients associated with the AP that are labeled as non-sticky clients.

16. The system of claim 11, wherein a sticky client is a client that (i) is associated to an AP with a signal strength lower than a threshold, (ii) the signal strength is lower than a signal strength to a neighboring AP, and (iii) the association has persisted for a threshold amount of time.

17. The system of claim 11, wherein:

the first layout of the set of APs comprises an indication of a respective proposed deployment location within the environment for each AP; and the second layout of the set of APs comprises, for at least one AP of the set of APs, a different proposed deployment location within the environment for the at least one AP.

18. The system of claim 11, wherein the first layout of the set of APs is evaluated with the machine learning model without a set of client data associated with the first layout of the set of APs.

19. The system of claim 11, wherein the information associated with the second layout comprises at least one of: (i) a number of the set of APs of the second layout, (ii) a respective location of each of the set of APs of the second layout, or (iii) a maximum transmit power of each of the set of APs of the second layout.

20. A non-transitory computer-readable medium comprising computer-executable instructions, which when collectively executed by one or more processors of a computing system cause the computing system to perform an operation comprising:

obtaining a first layout of a set of access points (APs) to be deployed within an environment;

determining, based on evaluating the first layout with a machine learning model, that at least a first AP of the set of APs will be associated with one or more sticky clients;

generating a second layout of the set of APs to be deployed within the environment using the machine learning model; and transmitting information associated with the second layout.

* * * * *